(12) United States Patent
Vickery et al.

(10) Patent No.: US 8,068,018 B2
(45) Date of Patent: Nov. 29, 2011

(54) CONFIRMING THE PRESENCE OF A RUN FLAT SAFETY BAND INCORPORATING A WIRELESS DEVICE

(75) Inventors: Paul Edward Vickery, Towcester (GB); Graham Eves, Calne (GB)

(73) Assignee: Transense Technologies PLC, Oxon (GB)

( * ) Notice: Subject to any disclaimer, the term of this patent is extended or adjusted under 35 U.S.C. 154(b) by 397 days.

(21) Appl. No.: 12/300,938

(22) PCT Filed: Apr. 24, 2007

(86) PCT No.: PCT/GB2007/001485
§ 371 (c)(1),
(2), (4) Date: Nov. 14, 2008

(87) PCT Pub. No.: WO2007/132145
PCT Pub. Date: Nov. 22, 2007

(65) Prior Publication Data
US 2009/0206997 A1  Aug. 20, 2009

(30) Foreign Application Priority Data

| May 17, 2006 | (GB) | .................................. | 0609871.9 |
| Jun. 30, 2006 | (GB) | .................................. | 0613061.1 |

(51) Int. Cl.
*G08B 21/00* (2006.01)

(52) U.S. Cl. .... 340/442; 340/447; 73/146.4; 152/152.1; 152/158

(58) Field of Classification Search .......... 340/442–448; 73/146–146.8; 200/61.22; 152/152, 158, 152/516, 520, 152.1
See application file for complete search history.

(56) References Cited

U.S. PATENT DOCUMENTS

| 6,285,342 B1 | 9/2001 | Brady et al. | |
| 6,397,670 B1 | 6/2002 | Dufournier et al. | |
| 2003/0160501 A1* | 8/2003 | Lust | ............................ 301/11.2 |
| 2004/0011446 A1* | 1/2004 | Boulot | ....................... 152/152.1 |
| 2004/0089389 A1 | 5/2004 | Naito | |
| 2005/0110277 A1 | 5/2005 | Adamson et al. | |
| 2006/0136782 A1 | 6/2006 | Corniot | |

FOREIGN PATENT DOCUMENTS

| DE | 19728601 A1 | 1/1999 |
| DE | 10030402 A1 | 2/2001 |
| EP | 0775601 A1 | 5/1997 |
| EP | 0983877 A2 | 3/2000 |
| EP | 1619052 A1 | 1/2006 |
| FR | 2888779 A1 | 1/2007 |
| GB | 2112981 A | 7/1983 |
| JP | 2005119543 A | 5/2005 |
| WO | W09967851 | 12/1999 |
| WO | WO0187646 A1 | 11/2001 |
| WO | WO0238400 A1 | 5/2002 |
| WO | WO03038747 A2 | 5/2003 |

* cited by examiner

*Primary Examiner* — Jeffery Hofsass
(74) *Attorney, Agent, or Firm* — Keusey & Associates, P.C.

(57) ABSTRACT

A run flat safety band 1 has a wireless sensor 11 incorporated therein, which can be remotely interrogated in order remotely to confirm that the safety band is fitted on a wheel 4. The sensor 11 includes a pressure and temperature sensor, enabling the pressure and temperature within the tire 2 mounted on the wheel 4 to be remotely checked, by means of which remote indication can be provided that the tire 2 has deflated and is running on the runflat band 1 and also that the tire 2 is overheating and likely to break up prematurely while running on the runflat band 1.

10 Claims, 3 Drawing Sheets

CONFIRMING THE PRESENCE OF A RUN FLAT SAFETY BAND INCORPORATING A WIRELESS DEVICE

BACKGROUND OF THE INVENTION

1. Field of the Invention

The present invention relates to wheel well fillers or runflat safety bands and more particularly to such bands which incorporate a wireless device for remotely confirming the presence of the band on a wheel.

2. The Prior Art

A wheel well filler or runflat safety band is a type of run flat system that can be retro fitted to a standard wheel and which operates to prevent the tire bead from dropping into the wheel well when the tire pressure decreases, either gradually due to a simple puncture or suddenly due to a blowout. Were the bead to drop into the wheel well, the tire could work itself off the wheel. The runflat safety band is engaged into the well of the wheel, allowing the tire bead to move across the wheel when the pressure within the tire drops, but preventing the beads from falling into the wheel well and thereby locking the tire onto the wheel and ensuring that there is always rubber between the wheel rim and the road surface or ground. Thus, steering, braking and cornering control are better maintained and the risk of accident due to tire deflation greatly reduced. The system enables the driver to continue driving after deflation for a short period to a safe place where the wheel can be changed. The distance achieved before the tire breaks up depends on the speed, on the amount of cornering and on surface conditions. There are different designs of band made from metal, or plastic, or a combination of the two, but all are basically composed of a ring, in one or more parts, whose width is equal to the width of the wheel well and which has dimples or inserts which rest on the bottom of the wheel well to space the band radially outwardly from the bottom of the well.

However, since the runflat safety band is mounted inside the wheel well, it is completely concealed within the wheel once the tire is fitted, and hence it is not possible from an external inspection to check whether the band is fitted to the wheel or not, for example after replacement of the tire. With a number of countries proposing regulations requiring the fitment of runflat safety bands to certain categories of vehicles, there is a concern that the authorities will not have a ready means of checking that the runflat safety bands have been fitted.

SUMMARY OF THE INVENTION

According to the present invention there is provided a wheel well filler or runflat safety band having a wireless device attached thereto that is remotely interrogatable in order to confirm the presence of the filler on the wheel.

A runflat safety band well filler according to the invention has the advantage that the presence of the runflat safety band can easily and reliably be verified via a simple external check, thereby avoiding the possibility of the runflat safety band being left off the wheel.

The wireless device is preferably a wireless sensor such as a SAW sensor, and may be fitted within a pressed safety band spacer dimple, fitted to a bracket provided on the safety band, or fitted to the underside of the sensor band. A suitable antenna will be provided on the sensor which may extend radially into tile tire cavity.

In a particularly preferred embodiment, the wireless sensor is a pressure and temperature sensor which provides remote indication of the pressure and temperature within the tire, being interrogated to confirm the presence of the runflat safety band on the wheel, the ability to confirm that the tire is running on the runflat band following tire deflation and, because of temperature measurement, indicating that the tire is overheating and likely to break up prematurely whilst running on the runflat band.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE PREFERRED EMBODIMENT

Figure 1A:
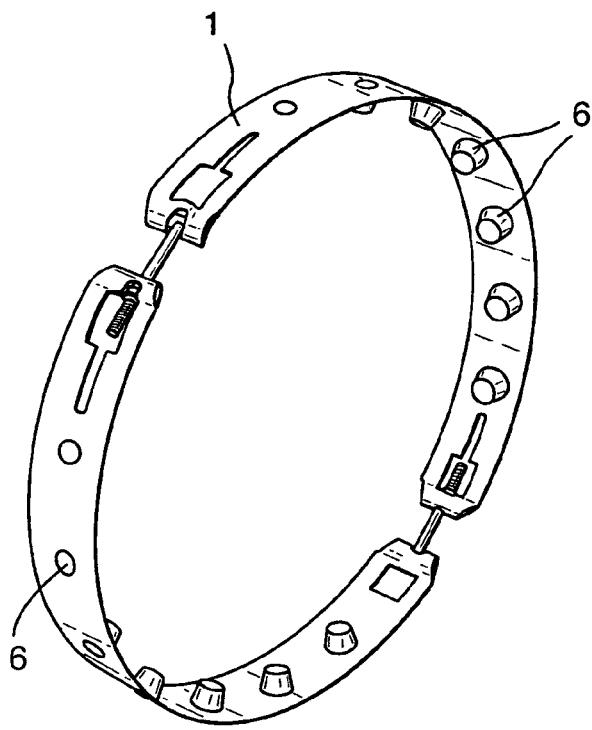
FIG. 1A is a perspective view of a conventional runflat safety band.
Figure 1B:
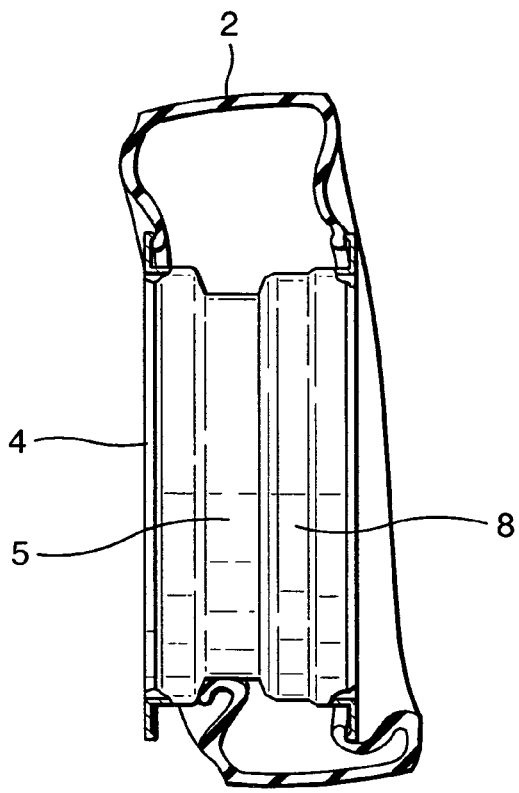
FIG. 1B is a perspective view of a wheel/tire assembly showing how the tire can skew on the wheel upon deflation.

Referring to FIG. 1A, there is shown a runflat safety band 1 which is generally known in the art, for fixing into the well of a wheel hub in order to prevent skewing of the tire upon deflation during use. As shown in FIG. 1B, upon loss of pressure within the tire 2, the bead 3 can slide across the inner surface of the wheel 4 and drop into the wheel well 5. This further reduces the tension holding the other bead on the rim, allowing the tire to further skew, which results in a severe loss of control to the driver of the vehicle.

Figure 1C:
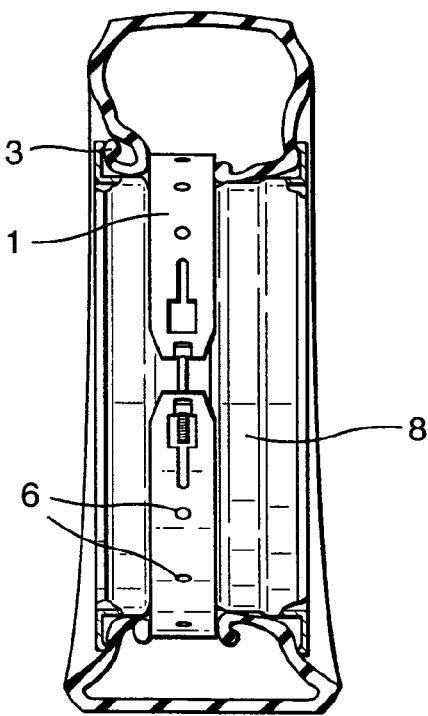
FIG. 1C is a sectional view through a tire with the runflat safety band of FIG. 1A fitted.

The runflat safety band 1 is fitted to the wheel so as to engage in the wheel well as shown in FIG. 1C. The band 1 has inwardly extending studs 6 which engage against the radially inner surface of the well 5 so that the band projects out to the main inner surface 8 of the wheel, thereby preventing the tire bead 3 from sliding across the wheel.

Figure 2:
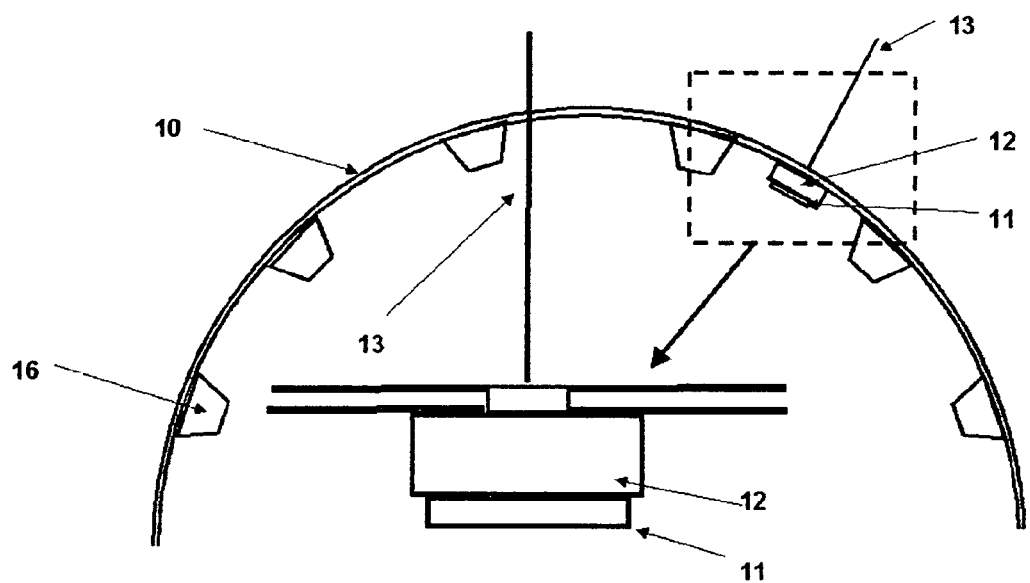
FIGS. 2 to 4 are show illustrative views of three embodiments of wireless sensor incorporated into a runflat safety band in accordance with the invention.

Referring now to FIG. 2, there is shown a runflat safety band 10 according to a first aspect of the invention having a wirelessly interrogatable sensor 11 attached thereto by means of which the presence of absence of the band 10 from the wheel can be ascertained. The sensor 11 is mounted in a housing 12 which is attached to the radially inner surface of the band 10 between a neighbouring pair of studs 16. The thickness of the sensor and housing together is less than the height of the studs 16 so that the sensor does not rest against the base of the wheel well 5. An antenna 13 extends radially outwardly from the sensor housing 12, through the band 10 and into the aperture defined between the wheel and the tire.

Figure 3:
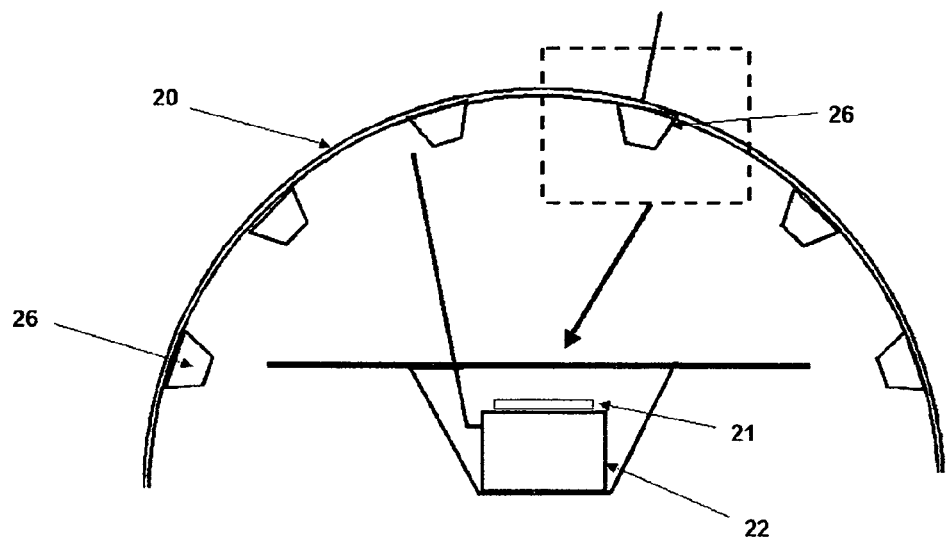

In an alternative arrangement shown in FIG. 3, the sensor 21 and housing 22 are mounted within one of the studs 26 of the runflat safety band 20, an antenna 23 again extending radially outwardly from the sensor, through the band 20 and into the tire cavity.

Figure 4:
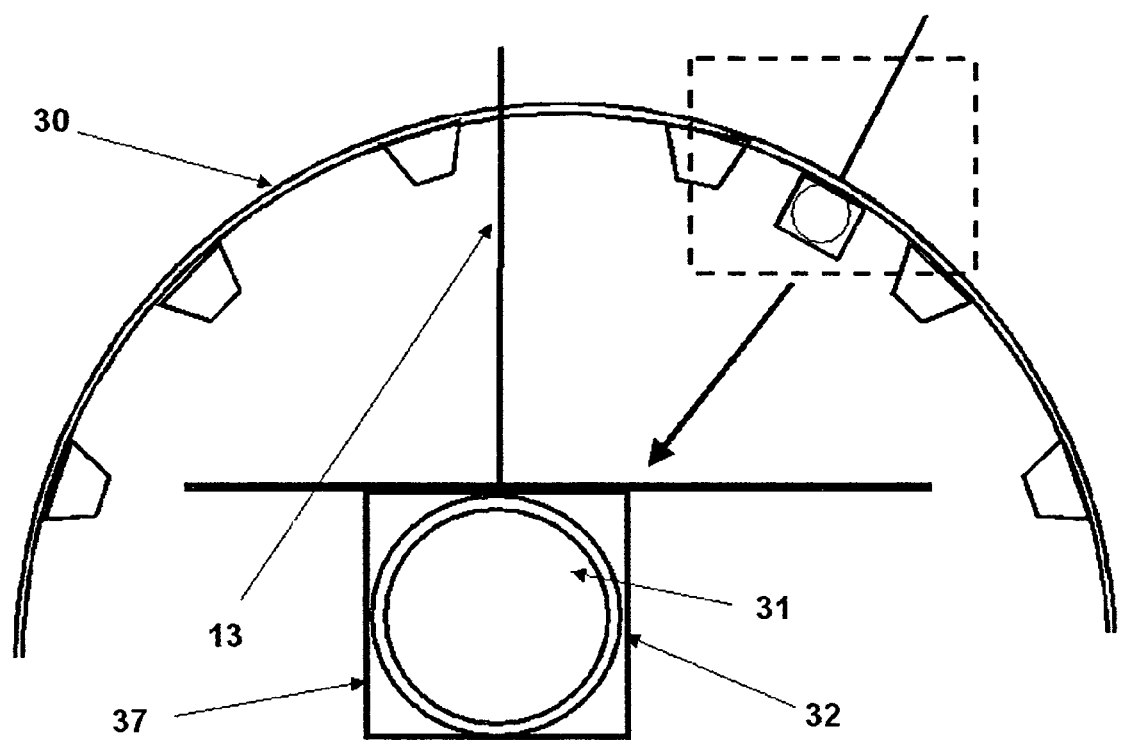

FIG. 4 shows a third embodiment in which the sensor 31 and housing 32 are mounted in a bracket 37 which is again attached to the inner surface of the band 30, with an antenna extending radially outwardly through the band 30.

The sensor should be mounted on the inner surface of the band so that it is protected by the band against damage. Furthermore, other antenna configurations are possible, including electrically coupling the sensor to the band itself such that the band acts as the antenna.

The sensor is programmed to emit a response when interrogated in a manner well known to the person skilled in the art, which response signal is detected as confirmation of the presence of the band on the wheel. Advantageously, the sensor is a SAW sensor which is in fluid communication with the air in the tire such that it also measures operating parameters of the tire such as temperature, pressure and the like. The sensor may then be configured for separate interrogation depending on whether the tire pressure, temperature, running on the runflat band, driving too fast whilst running on the runflat band or the like is required or simply confirmation of the presence of the band. Alternatively, however, the detection of a pressure signal from the sensor can be used to interpret that the sensor, and hence the band, is present.

What is claimed is:

1. A run flat safety band for a wheel comprising:
   a remotely interrogatable wireless device fitted to an underside of the band which, in use, faces radially inwardly towards the center of the wheel; and
   means for detecting a response signal upon interrogation of the device providing confirmation of the presence of the band on the wheel.

2. The run flat safety band according to claim 1, wherein the wireless device is a wireless sensor.

3. The run flat safety band according to claim 2, wherein the wireless device is a SAW sensor.

4. The run flat safety band according to claim 1, wherein the wireless device is fitted within a spacer dimple formed on the band.

5. The run flat safety band according to claim 1, wherein the wireless device is fitted to a bracket attached to the band.

6. The run flat safety band according to claim 1, wherein the wireless device includes an antenna, which, in use, preferably extends radially outwardly into the tire cavity.

7. The run flat safety band according to claim 1, wherein the wireless device includes a pressure and temperature sensor which provides a remote indication of the pressure and temperature within the tire, the device, in use, being interrogated to confirm the presence of the well filler on the wheel as well as to indicate that the tire is running on the runflat band following tire deflation and to indicate that the tire is overheating and likely to break up prematurely whilst running on the runflat band.

8. A wheel assembly comprising:
   a hub;
   a tire mounted on the hub so as to form therewith an air tight chamber; and
   a run flat safety band including (i) a remotely interrogatable wireless device fitted to an underside of the band which, in use, is mounted on the hub in the airtight chamber facing radially inwardly towards the center of the wheel and (ii) means for detecting a response signal upon interrogation of the device providing confirmation of the presence of the band on the wheel.

9. The wheel assembly according to claim 8, wherein the hub includes a well and wherein the run flat safety band is mounted in the well.

10. A method of confirming the presence of a run flat safety band on a wheel assembly, comprising the steps of:
   providing a wheel assembly including a hub and a tire mounted on the hub so as to form therewith an air tight chamber;
   providing a run flat safety band including a remotely interrogatable wireless device fitted to an underside of the band which, in use, is mounted on the hub in the airtight chamber facing radially inwardly towards the center of the wheel; and
   emitting an interrogation signal in the region of the wheel assembly and monitoring for a response signal from the wireless device, the detection of a response signal confirming the presence of run flat safety band on the hub.

* * * * *